(12) United States Patent
Valentin

(10) Patent No.: US 11,820,613 B2
(45) Date of Patent: Nov. 21, 2023

(54) SYSTEM FOR PREVENTING SEMITRAILER COLLISIONS WITH A LOADING RAMP

(71) Applicant: JVJ-VALENTIN HOLDING APS, Sonderborg (DK)

(72) Inventor: Jan Valentin, Sonderborg (DK)

(73) Assignee: JVJ-VALENTIN HOLDING APS

( * ) Notice: Subject to any disclaimer, the term of this patent is extended or adjusted under 35 U.S.C. 154(b) by 0 days.

(21) Appl. No.: 17/768,761

(22) PCT Filed: Oct. 6, 2020

(86) PCT No.: PCT/EP2020/077971
§ 371 (c)(1),
(2) Date: Apr. 13, 2022

(87) PCT Pub. No.: WO2021/073952
PCT Pub. Date: Apr. 22, 2021

(65) Prior Publication Data
US 2023/0132643 A1    May 4, 2023

(30) Foreign Application Priority Data
Oct. 17, 2019   (DK) ........................... PA 2019 01224

(51) Int. Cl.
*B65G 69/00*   (2006.01)

(52) U.S. Cl.
CPC .... *B65G 69/005* (2013.01); *B65G 2203/0283* (2013.01); *B65G 2203/042* (2013.01)

(58) Field of Classification Search
CPC ................................................... B65G 69/005
See application file for complete search history.

(56) References Cited

U.S. PATENT DOCUMENTS

| | | | |
|---|---|---|---|
| 9,896,282 B2 | 2/2018 | Boston et al. | |
| 10,227,190 B2 | 3/2019 | Brooks et al. | |
| 2011/0290596 A1 | 12/2011 | Perkins | |
| 2014/0255134 A1* | 9/2014 | Brooks, IV | .......... B65G 69/005 |
| | | | 414/401 |
| 2015/0009046 A1 | 1/2015 | Senfleben et al. | |
| 2015/0375947 A1 | 12/2015 | Hochstein et al. | |
| 2018/0304748 A1 | 10/2018 | Marshall | |

FOREIGN PATENT DOCUMENTS

| | | |
|---|---|---|
| DE | 10 2015 211187 A1 | 12/2015 |
| GB | 2528380 B | 5/2021 |
| WO | 2014/125040 A1 | 8/2014 |
| WO | WO-2014125040 A1 * | 8/2014 .......... B65G 69/001 |
| WO | 2016/057766 A1 | 4/2016 |
| WO | WO-2017067723 A1 * | 4/2017 ............. B60K 28/00 |

(Continued)

OTHER PUBLICATIONS

International Search Report (ISR), International Application No. PCT/EP2020/077971, dated Jan. 21, 2021, 4 pages.

(Continued)

*Primary Examiner* — Kaitlin S Joerger
(74) *Attorney, Agent, or Firm* — Ware, Fressola, Maguire & Barber LLP

(57) ABSTRACT

The present invention relates to a system for preventing semitrailer collisions with a loading ramp. The system comprises a sensor unit network, and a guide block.

5 Claims, 9 Drawing Sheets

(56) References Cited

FOREIGN PATENT DOCUMENTS

| WO | 2017/205013 | A1 | | 11/2017 | | |
|---|---|---|---|---|---|---|
| WO | 2019/091644 | A1 | | 5/2019 | | |
| WO | WO-2019091644 | A1 | * | 5/2019 | ........... | B65G 69/005 |
| WO | WO-2021073899 | A1 | * | 4/2021 | ........... | B65G 69/005 |
| WO | WO-2021073952 | A1 | * | 4/2021 | ........... | B65G 69/005 |

OTHER PUBLICATIONS

Written Opinion of the International Searching Authority, International Application No. PCT/EP2020/077971, dated Jan. 21, 2021, 7 pages.

Danish Search Report, in English language, for application No. PA 2019 01224, dated Oct. 14, 2020, 2 pages.

\* cited by examiner

SYSTEM FOR PREVENTING SEMITRAILER COLLISIONS WITH A LOADING RAMP

BACKGROUND OF THE INVENTION

The present invention relates to systems for preventing semitrailer collisions with loading ramps. Accidents happen every day in connection to loading and unloading of goods from trucks by loading ramps. These accidents all too often cost human lives.

To understand the issues, it is essential to understand the workflow, in which a semitrailer backs up to a loading ramp. The driver first reverses the semitrailer towards the loading ramp. When the semitrailer is in place the ramp employee's task of loading/unloading cargo begins. Upon completion of the task, the driver can drive off, away from the loading ramp.

Regarding the safety of the employees in the ramp area, there are several things that create dangerous situations. When an employee is positioned on a ground surface around the loading ramp, he or she is within the driver's blind spot, and there is a real danger of the employee getting trapped between the semitrailer and the loading ramp. Next, there is a huge risk in case the ramp employees use a forklift or pallet jack in the loading of cargo. The force influenced when driving from the loading ramp and into the semitrailer often results in the semitrailer creeping up to several centimeters. Situations like this create enormous danger for the ramp employees, as the edge of the loading ramp tips down under the semitrailer. This can create enough distance to create a fall risk, where the ramp employee falls between the loading ramp and the semitrailer. Finally, the driver is rarely in dialogue with the ramp employee, which is why there is a risk of the driver pulling away from the ramp too early.

Considering the risk of material damage, one must keep in mind that the drivers back up to the loading ramps without any assistance. Trucks operating a semitrailer do not have integrated rear cameras or similar measures to guide them. This partly means that the distance can be difficult to assess thereby increasing the risk of collision with the loading ramp.

Optical devices are often present at the loading ramp to alert the driver when he is in place in front of the loading ramp. However, for some reason, oftentimes the driver does not pay attention to the warning signal and collides the semitrailer with the loading ramp. Since many types of semitrailers arrive at a loading ramp each day, it is difficult to position a physical stop in front of the rear wheels of the semitrailer. The distance between the rear wheels and the rear end of the semitrailer simply varies too much from one type of semitrailer to another.

WO2019091644 discloses a system for preventing semitrailer collisions with a loading ramp. The system comprises a sensor and guide block. The sensor is configured for sensing when the rear end of a semitrailer is approaching a loading ramp. The guide block is adapted to be positioned on the ground. The guide block comprises wheel blocking means configured for supporting the tread of a rear tire of the semitrailer. The wheel blocking means is configured to move from a forwarded position relative to the loading ramp to a retracted position relative to the loading ramp as the semitrailer is reversing towards the loading ramp. The sensor is configured to send a blocking signal to the guide block when the distance between the rear end of the semitrailer and the loading ramp is below a preset threshold, thereby blocking the movement of the wheel blocking means. No solutions are disclosed for avoiding collisions with personnel.

WO2014125040 discloses a loading bay docking system for docking trailers at a loading bay door. The loading bay docking system comprises an elongate track, a carriage mounted on the track moveable back and forth along the track, a carriage actuating ram for moving the carriage along the track, and a controller. A series of safety sensors are provided surrounding the loading bay to detect if any object comes in between the trailer and the loading bay as the trailer is being reversed towards the loading bay. If an object is detected, the actuating ram is immediately stopped. The photo eyes/safety sensors located in front of the loading bay will provide added safety. If a person walks in between the trailer and the loading bay when the trailer is moving towards the building, the power pack will stop and prevent the trailer from hitting the person.

SUMMARY OF THE INVENTION

It is an object of the present invention to overcome the above-mentioned problems.

One aspect relates to a system for preventing semitrailer collisions with a loading ramp comprising:
- a guide block adapted to be positioned on the ground, laterally and/or medially to the opening of a loading ramp; wherein the guide block comprises a first wheel blocking means configured as a sled adapted for supporting the tread of a rear tire of a semitrailer, and configured to move, preferably passively, from a forwarded position relative to a loading ramp to a retracted position relative to the loading ramp, when being pushed by the rear tire as the semitrailer is reversing towards the loading ramp;
- a first sensor unit configured for sensing when the rear end of a semitrailer is approaching the guide block;
- a second sensor unit configured for sensing when the rear end of a semitrailer is approaching the loading ramp; wherein the second sensor unit is configured to send a blocking signal to the guide block when the distance between the rear end of the semitrailer and the loading ramp is below a preset threshold, thereby blocking the movement of the sled; and
- a third sensor unit configured for sensing when a person and/or a moving or non-moving object is positioned in the area bounded by the guide block and the loading ramp; wherein the third sensor unit is configured to send a blocking signal to the guide block when a person and/or a moving or non-moving object is positioned in the area bounded by the guide block and the loading ramp, thereby blocking the movement of the sled;

wherein the first sensor unit is configured to send an activation or wakeup signal to the third sensor unit when the rear end of a semitrailer is registered to approach the guide block.

In principle, the sled is initially positioned at an extended position relative to the loading ramp, where the rear end of the semitrailer is at no risk of colliding with the loading ramp. However, before the sled is set into motion, it is important that there are no objects or persons at risk of being hit by the reversing semitrailer. Therefore, the present invention provides a collaborative network of sensor units. At first, a sensor unit registers that the rear end of a semitrailer is approaching the guide block and then activates a second sensor unit that screens the area bounded by the guide block and the loading ramp. When the latter sensor unit sends an all clear signal, the sled is released. The driver then continues to reverse the semitrailer as the sled continuously supports the rear wheel in a retractive movement, relative to the loading ramp, until a sensor unit sends a blocking signal to the guide block when the distance between the rear end of the semitrailer and the loading ramp is below a preset threshold. In response to the blocking signal, the wheel blocking means locks its position, and the driver will feel that the semitrailer brakes. He then knows that the semitrailer is in position. Thereby, the semitrailer will never risk colliding with objects, personnel, or the loading ramp, and the solution is independent on the type of semitrailer.

The first sensor unit is configured for sensing when the rear end of a semitrailer is approaching the guide block and may comprise any suitable type of sensor, such as a motion sensor, a distance sensor, an infrared sensor, a triangulation sensor, an ultrasonic sensor, a radar, a doppler sensor, or the like, or combinations thereof. In one or more embodiments, the guide block is configured to be in a sleep mode when not in use to reduce power consumption. In this embodiment, the first sensor unit is configured to send a wakeup signal to the guide block when
sensing that the rear end of a semitrailer is approaching the guide block.

Obviously, the guide block is configured for receiving a wakeup signal, preferably from the first sensor unit.

The second sensor unit is configured for sensing when the rear end of a semitrailer is approaching a loading ramp may comprise any suitable type of sensor, such as a motion sensor, a distance sensor, an infrared sensor, a triangulation sensor, an ultrasonic sensor, or the like, a radar, a doppler sensor, or combinations thereof.

The third sensor unit is configured for sensing when a non-moving object, and optionally a person or a moving object, is positioned in the area bounded by the guide block and the loading ramp and preferably comprises a radar.

In one or more embodiments, the wheel blocking means is configured such that the work of the rear wheel of the semitrailer on the wheel blocking means makes the wheel blocking means move from a forwarded position relative to the loading ramp to a retracted position relative to the loading ramp. Hence, it is only the force of the reversing semitrailer that moves the wheel blocking means from a forwarded position to a retracted position. Such a specific configuration could e.g. be that the wheel blocking means is connected to a locking means comprising a toothed rack, and a locking pin; and wherein the locking pin is configured to engage with the toothed rack upon receipt, either directly or indirectly, of a blocking signal from a sensor unit. The toothed rack is preferably positioned along the length of the guide block. The locking pin will then be in a retracted position until the blocking signal is received.

In one or more embodiments, the sled is connected to a locking means comprising a toothed rack, and a first and a second locking pin; and wherein the first and second locking pins are configured to engage with the toothed rack when the sled is in the forwarded position relative to a loading ramp, and configured to disengage from the toothed rack upon receipt of an activation or wakeup signal from the third sensor unit. This configuration secures that the third sensor unit will have to activate, directly or indirectly, the locking means such that the locking pins are disengaged from the toothed rack, before the sled can move.

In one or more embodiments, the first and/or second locking pins are configured to engage with the toothed rack upon receipt, either directly or indirectly, of a blocking signal from the second sensor unit and/or the third sensor unit. This configuration secures that the semitrailer cannot collide with objects, personnel, or the loading ramp when moving together with the sled.

In one or more embodiments, the first locking pin is configured as a pivotable lever arm with a free end shaped to fit between two neighboring teeth of the toothed rack.

In one or more embodiments, the first and/or second locking pins are engaged and/or disengaged from the toothed rack by the aid of a piston.

In one or more embodiments, the first locking pin is configured as a pivotable lever arm with a free end shaped to fit between two neighboring teeth of the toothed rack, and wherein the lever arm is connected to the piston via a wire or chain, such as a roller chain.

In one or more embodiments, the second locking pin is an elongate rod with a first end pivotably connected to an elongate member, which is pivotably connected to the piston; wherein the second end of the elongate rod is shaped to fit between two neighboring teeth of the toothed rack. In one or more embodiments, the elongate rod runs in a channel formed in the sled. This configuration transfers some of the forces exerted on the elongate rod to the sled.

In one or more embodiments, the system further comprises a locking system adapted to retain and release the sled. In one or more embodiments, the locking system comprises a locking pin, and an anchor positioned below the sled; wherein the locking pin is pivotably attached to the bottom side of the sled; wherein the locking pin comprises a first end adapted for moving from an extended position on the top side of the sled through a hole in the sled to a retracted position within the hole; and a second end adapted for moving from an extended position on the bottom side of the sled to a retracted position also on the bottom side of the sled; wherein the second end of the locking pin is adapted to be engaged with the anchor in its retracted position. This configuration allows the rear tire to get into position before the sled starts to move.

In one or more embodiments, the guide block further comprises an elongate guide rail extending along the length of the guide block; wherein the sled comprises:
a distal end, relative to the loading ramp, configured as a ramp;
a middle segment adapted for supporting the tread of a rear tire of the semitrailer; and
a proximal end, relative to the loading ramp, configured as an elevation or backstop;
wherein at least the middle segment is slidably attached to the guide rail. The guide rail is preferably a steel beam, such as a Hollow Steel Section (HSS) beam, providing sufficient strength to the guide block. HSS is a metal profile that has a hollow, tubular cross section. HSS units can be square, rectangular, circular, or elliptical. HSS structures are rounded, with radiuses that are about twice the thickness of the wall.

In one or more embodiments, the sled comprises:
a distal end, relative to the loading ramp, configured as a ramp;
a middle segment adapted for supporting the tread of a rear tire of the semitrailer; and
a proximal end, relative to the loading ramp, configured as an elevation or backstop. This configuration allows for the rear tire to fit into the sled.

In one or more embodiments, the system further comprises a guide rail adapted for supporting the sled; wherein the sled further comprises a second wheel blocking means; the second wheel blocking means adapted to slidably or rollably engage with the guide rail; wherein the guide rail is configured with one or more elevations along its path; and wherein when the second wheel blocking means engages with the elevations it moves from a retracted position to an elevated position. The wheel support is preferably integrated into the distal end of the sled.

In one or more embodiments, the second wheel blocking means comprises a flap adapted to move from a retracted position to an elevated position, and one or more wheels adapted to rollably engage with the guide rail.

In one or more embodiments, the second wheel blocking means further comprises a support wheel attached to and extending laterally to the flap, and a support and guide rail configured to support and guide the support wheel as the sled is moving between the forwarded position relative to the loading ramp and the retracted position relative to the loading ramp. This configuration strengthens the second wheel blocking means, making it more resistant to the forces exerted on it by the semitrailer.

The signals transmitted by the sensor units may be transmitted by wires or wireless.

In one or more embodiments, the sled is connected to a locking pin housing adapted to move the locking pin above and along the toothed rack.

In one or more embodiments, the first sensor unit, subsequent to a blocking signal, is configured to send a reactivation signal to the guide block when the distance between the rear end of the semitrailer and the loading ramp exceeds a preset threshold, thereby reactivating the guide block to move from a retracted position relative to the loading ramp to a forwarded position relative to the loading ramp.

In one or more embodiments, the first sensor unit is configured for sensing when the semitrailer has disengaged therefrom; and wherein the first sensor unit is configured to activate the guide block to move from a retracted position relative to the loading ramp to a forwarded position relative to the loading ramp.

A second aspect relates to the use of a system according to the present invention for preventing semitrailer collisions with a loading ramp.

It should be noted that embodiments and features described in the context of one of the aspects of the present invention also apply to the other aspects of the invention.

DETAILED DESCRIPTION OF THE INVENTION

Figure 1:
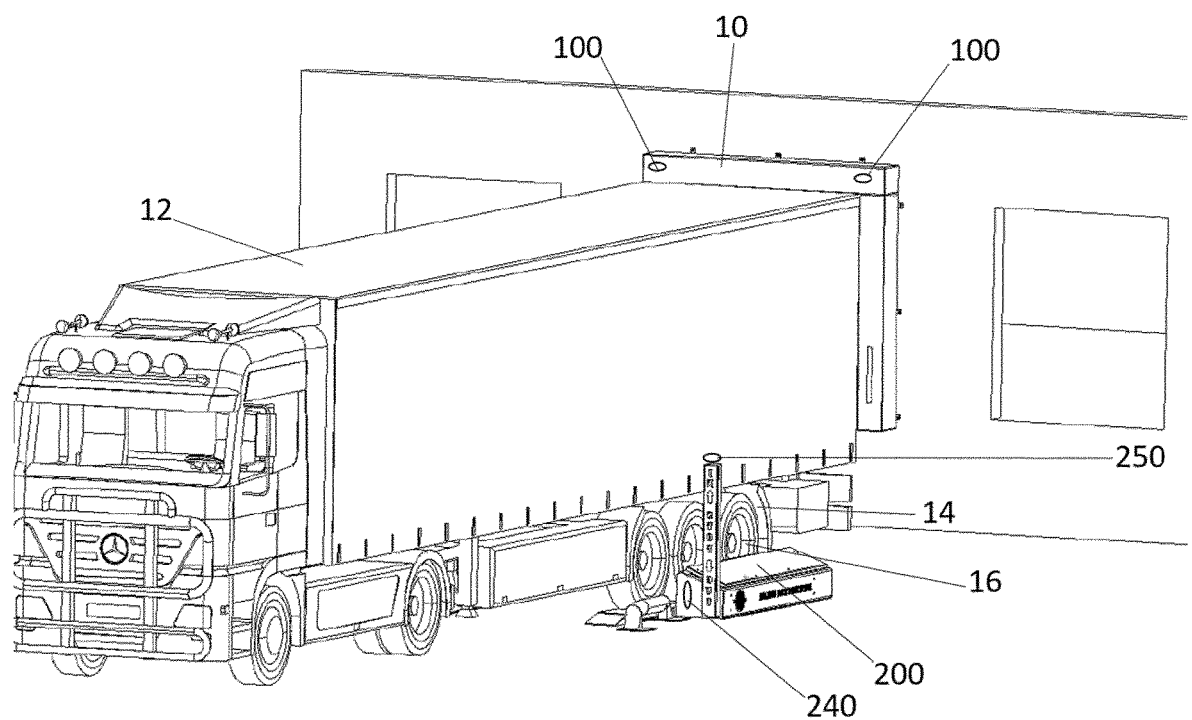
FIG. 1 shows a perspective view of a system in accordance with various embodiments of the invention.
Figure 2:
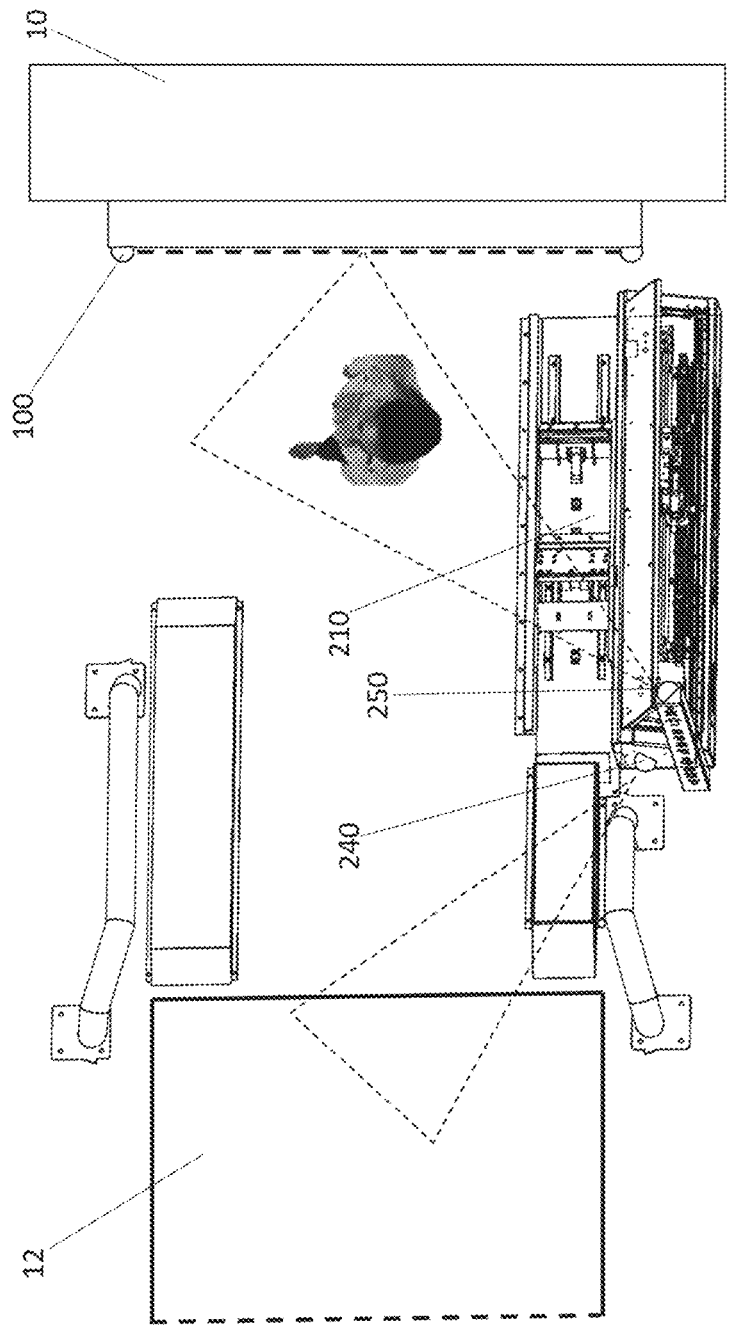
FIG. 2 shows a perspective view of a guide block in accordance with various embodiments of the invention, where the sled is shown in a forwarded position.

Referring to FIG. 1, the general scheme of the invention is shown in perspective view. FIG. 1 shows a system for preventing semitrailer collisions with a loading ramp 10. The system comprises a first sensor unit 240, a second sensor unit 100, a third sensor unit 250, and a guide block 200. The guide block 200 is adapted to be positioned on the ground and is here shown positioned laterally to the opening of the loading ramp 10. The first sensor unit 240 is configured for sensing when the rear end of a semitrailer 12 is approaching the guide block 200. When this happens, it activates the third sensor unit 250 that screens the area bounded by the guide block 200 and the loading ramp 10. In FIG. 2, a person is positioned in the area bounded by the guide block 200 and the loading ramp 10. When the third sensor unit 250 senses the presence of the person, it sends a blocking signal, directly or indirectly via the first sensor unit, to the guide block 200, thereby blocking the movement of the guide block 200, i.e. the sled 210. Later, when the person has left the area, the third sensor unit 250 sends an all clear signal, and the sled 210 is released. The driver then continues to reverse the semitrailer 12 as the sled 210 continuously supports the rear tire 16 in a retractive movement, relative to the loading ramp 10, until the second sensor unit 100 sends a blocking signal to the guide block 200 when the distance between the rear end of the semitrailer 12 and the loading ramp 10 is below a preset threshold. In response to the blocking signal, the sled 210 locks its position, and the driver will feel that the semitrailer 12 brakes. He or she then knows that the semitrailer 12 is in position. Thereby, the semitrailer will never risk colliding with objects, personnel, or the loading ramp, and the solution is independent on the type of semitrailer.

Figure 3:
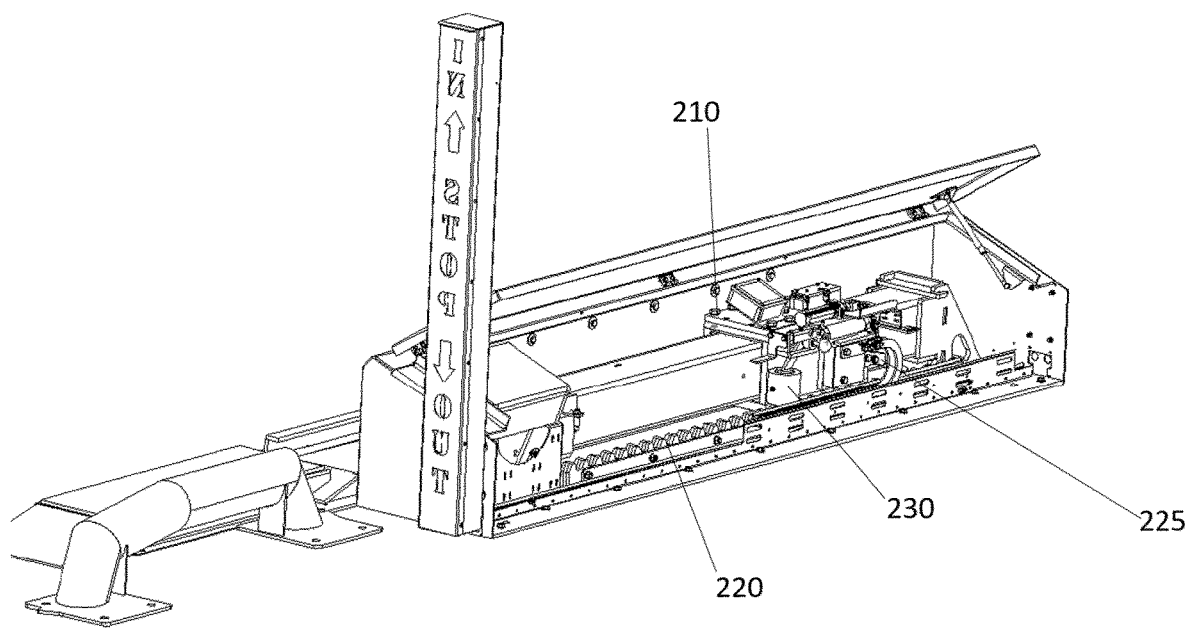
FIG. 3 shows a perspective view of a sled in accordance with various embodiments of the invention.

FIG. 3 shows a guide block 200 in accordance with various embodiments of the invention, where the sled 210 is connected to a locking means comprising a toothed rack 220, and two locking pins 225, 230. The locking pins 225, 230 are configured to engage with or disengage from the toothed rack 220 upon receipt, either directly or indirectly, of a blocking signal from a sensor unit (not shown, but could be either one of sensor units 100, 240 or 250 as seen in FIGS. 1 and 2).

Figure 4:
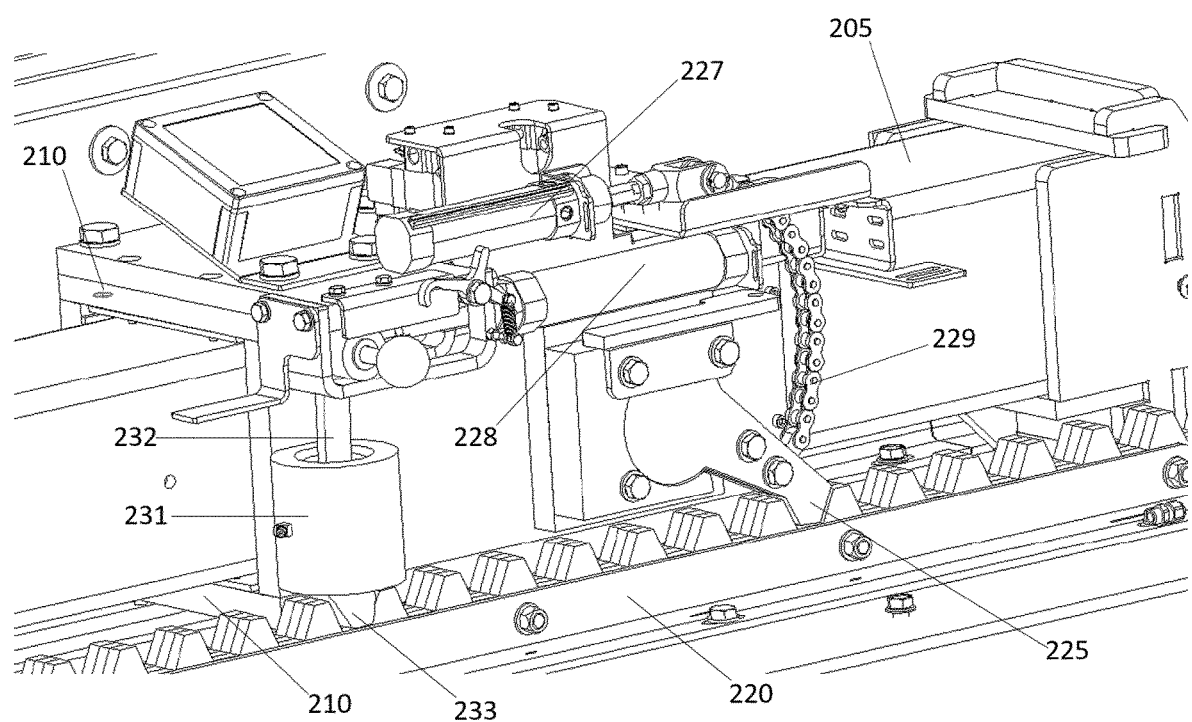
FIG. 4 shows a perspective view of a guide block in accordance with various embodiments of the invention, where the sled is shown in a retracted position.
Figure 5:
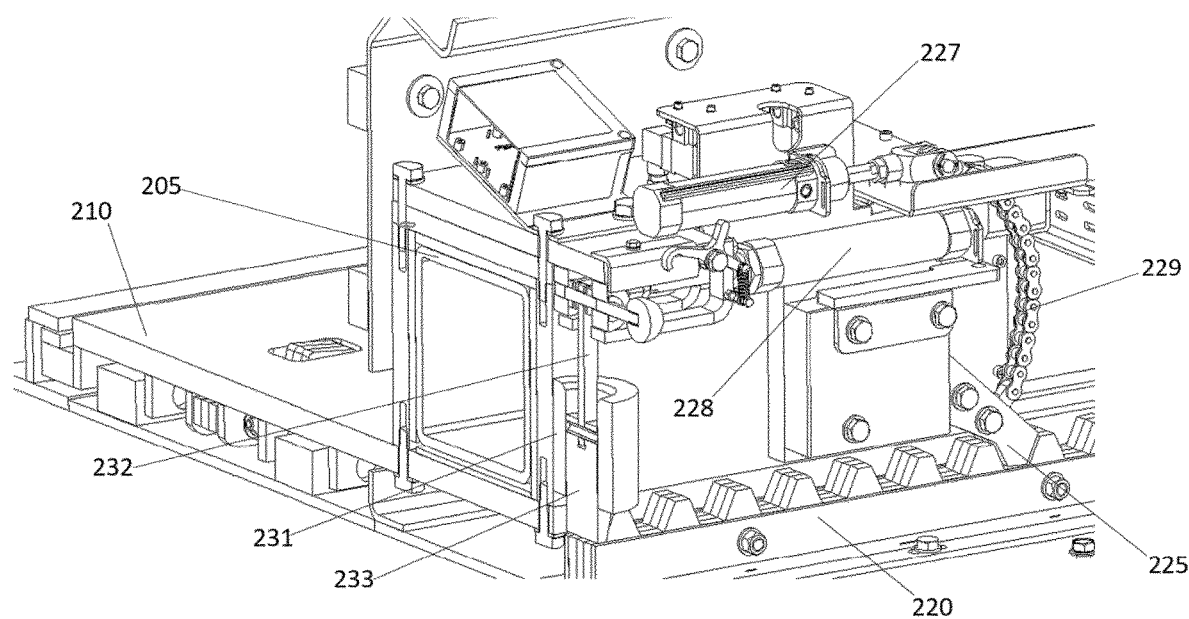
FIG. 5 shows a cross-sectional view of the sled shown in FIG. 4.
Figure 6:
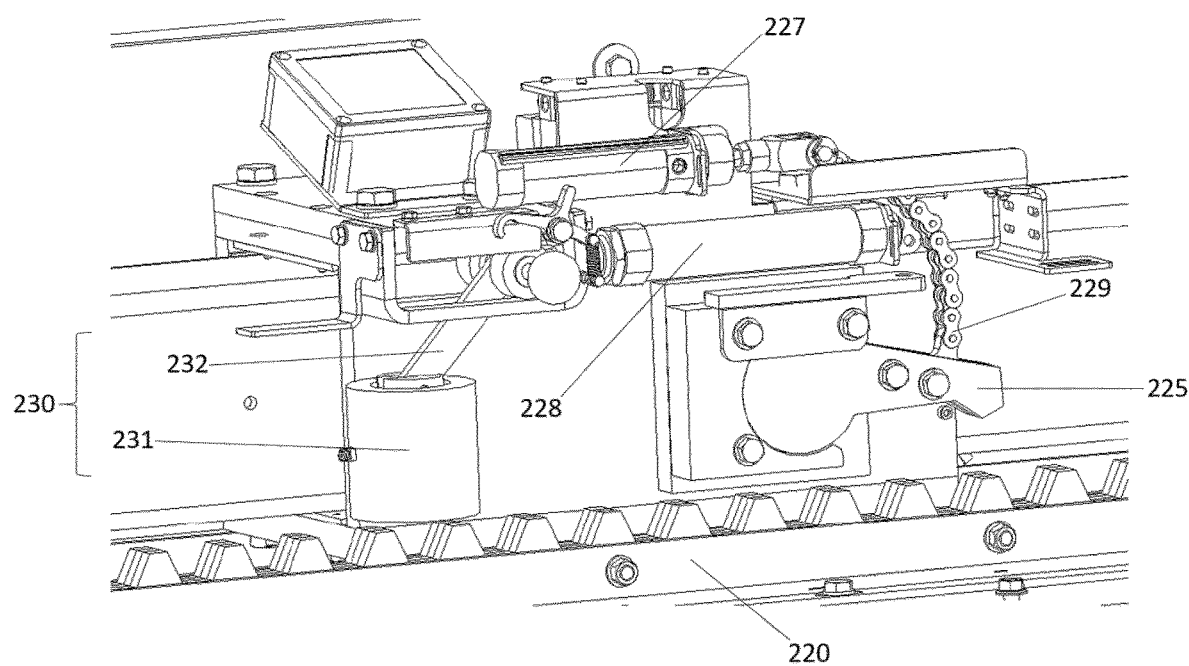
FIG. 6 shows a guide block in accordance with various embodiments of the invention, where the sled (not shown) is connected to a locking means.

FIG. 4 shows a closeup view of the locking means in FIG. 3. The first 225 and second 230 locking pins are both shown engaged with the toothed rack 220. The first 225 and second 230 locking pins are here both configured to engage with the toothed rack 220 when the sled 210 is in the forwarded position relative to a loading ramp, and configured to disengage from the toothed rack 220 upon receipt of an activation or wakeup signal from the third 250 sensor unit (FIGS. 1 and 2). This configuration secures that the third sensor unit 250 will have to activate, directly or indirectly, the locking means such that the locking pins 225, 230 are disengaged from the toothed rack 220, before the sled 210 can move. FIG. 6 shows the situation where the locking pins 225, 230 are disengaged from the toothed rack 220. The locking pins 225, 230 are moved by the aid of the pistons 227, 228. The first locking pin 225 is here shown configured as a pivotable lever arm with a free end shaped to fit between two neighboring teeth of the toothed rack 220, and wherein the lever arm is connected to the piston 227 via a roller chain 229. The second locking pin 230 is shown as an elongate rod 233 with a first end pivotably connected to an elongate member 232, which is pivotably connected to the piston 228. The second end of the elongate rod is shaped to fit between two neighboring teeth of the toothed rack 220. The elongate rod 233 runs in a tubular channel 231 that is formed in or connected to the sled 210. FIG. 5 shows a cross-sectional view of FIG. 4.

Figure 7:
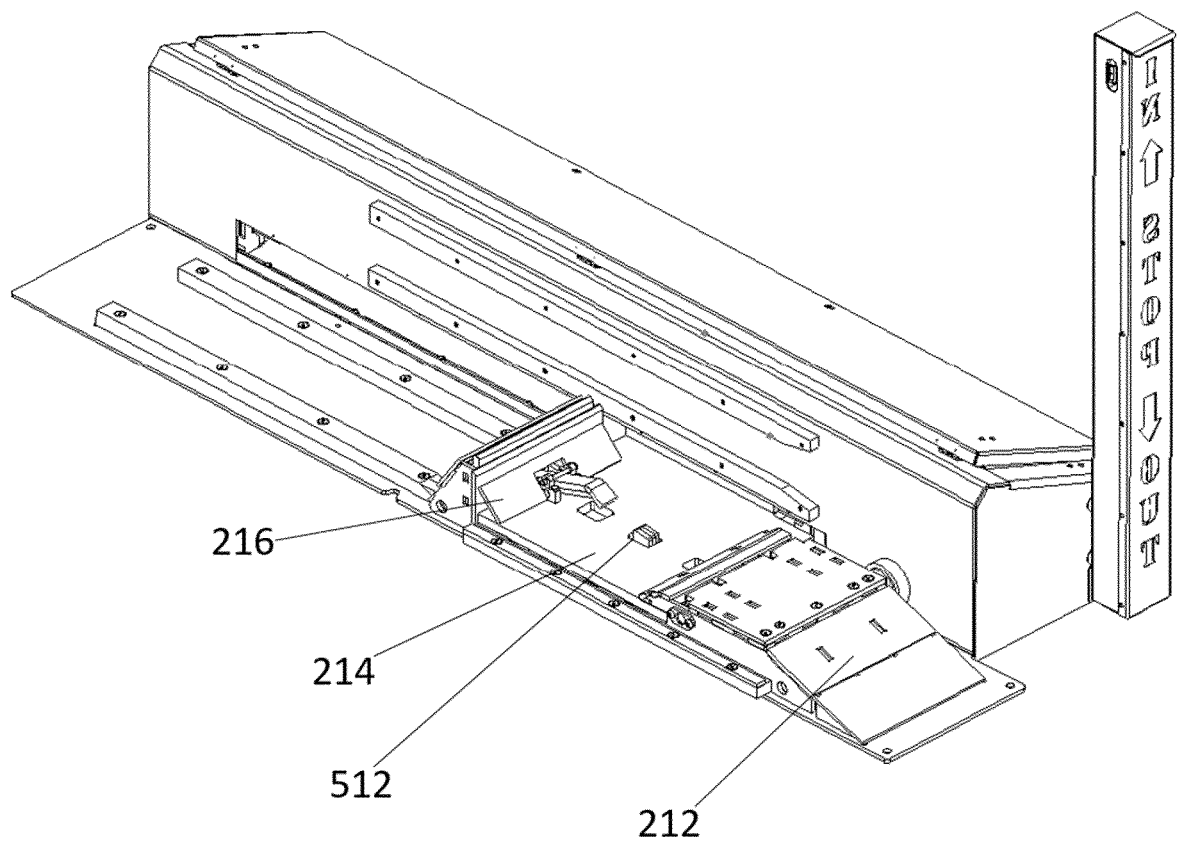
FIG. 7 is a perspective view of the guide block in accordance with various embodiments of the invention.
Figure 8:
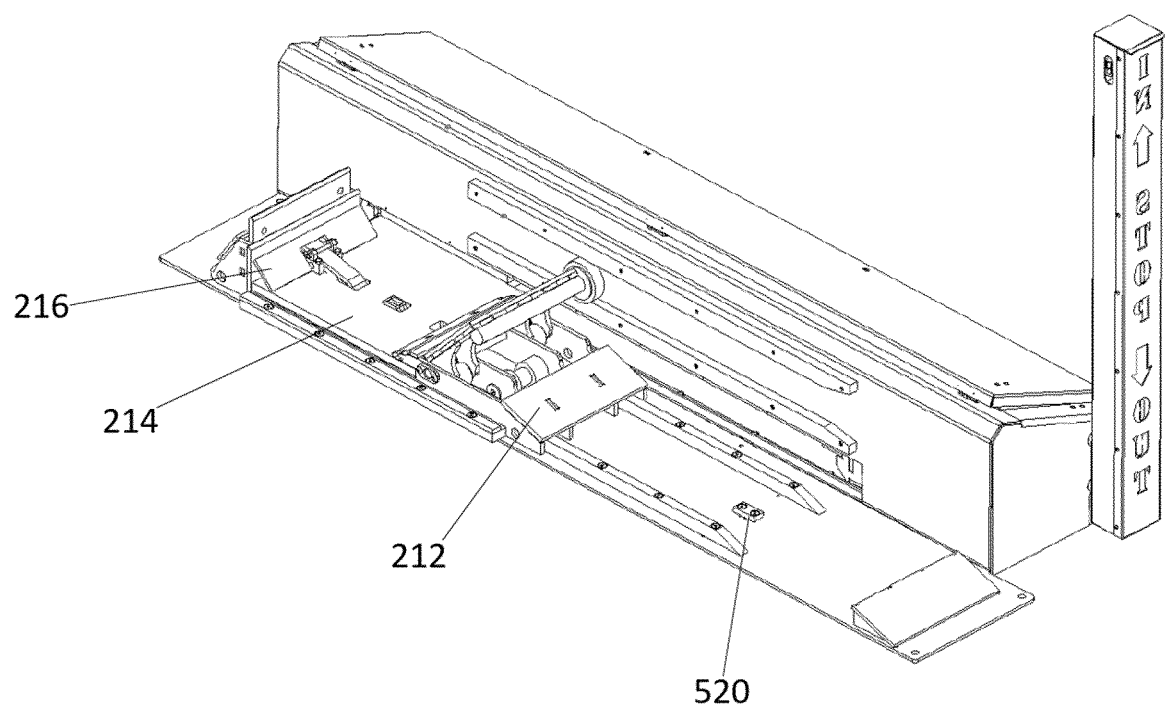
FIG. 8 is a perspective view of the guide block in accordance with various embodiments of the invention.

FIGS. 7 and 8 are perspective views of the guide block 200 in accordance with various embodiments of the invention, where most of the sled 210 may be seen. In FIG. 7, the sled is shown in a forwarded position relative to a loading ramp (not shown but may be seen in FIGS. 1 and 2), while FIG. 8 shows the sled in a retracted position relative to a loading ramp 10. The sled 210 is shown comprising a distal end 212, relative to the loading ramp 10, configured as a ramp; a middle segment 214 adapted for supporting the tread of a rear tire of the semitrailer 12; and a proximal end 216, relative to the loading ramp 10, configured as an elevation or backstop.

Figure 9:
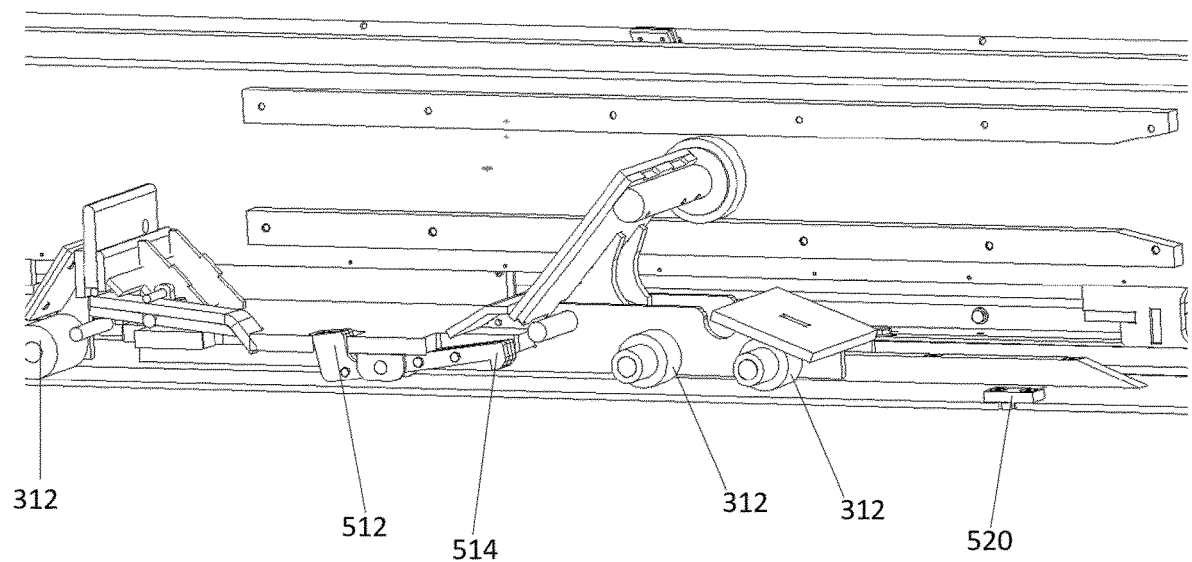
FIG. 9 is a cross-sectional view of a guide block in accordance with various embodiments of the invention.

To secure the rear tire to get into position before the sled 210 starts to move, the system further comprises a locking system adapted to retain and release the sled 210. The locking system comprises a locking pin, and an anchor 520 positioned below the sled 210 (FIG. 9). The locking pin is pivotably attached to the bottom side of the sled 210, and comprises a first end 512 adapted for moving from an extended position on the top side of the sled 210 through a hole in the sled 210 to a retracted position within the hole; and a second end 514 adapted for moving from an extended position on the bottom side of the sled 210 to a retracted position also on the bottom side of the sled. The second end 514 of the locking pin is adapted to be engaged with the anchor 520 in its retracted position (not shown). To ease its movement across a surface, the sled 210 is provided with wheels 312.

REFERENCES

10 Loading ramp
12 Semitrailer
14 Rain flap
16 Rear tire
100 Second sensor unit
200 Guide block
205 Guide rail
210 Sled
212 Distal end
214 Middle segment
216 Proximal end
220 Toothed rack
225 First locking pin
227 Piston
228 Piston
229 Chain
230 Second locking pin
231 Channel
232 Elongate member
233 Elongate rod
240 First sensor unit
250 Third sensor unit
312 Wheels
512 First locking pin end
514 Second locking pin end
520 Anchor

The invention claimed is:

1. A system for preventing semitrailer collisions with a loading ramp (10) comprising:
   a guide block (200) positioned on a ground surface, laterally and/or medially to an opening of the loading ramp (10); wherein the guide block (200) comprises a first wheel blocking means configured as a sled (210) adapted for supporting treads of a rear tire (16) of a semitrailer (12), and configured to move passively from a forwarded position relative to the loading ramp (10) to a retracted position relative to the loading ramp (10) when pushed by the rear tire as the semitrailer (12) is reversing towards the loading ramp (10);
   a first sensor unit (240) configured for sensing when a rear end of the semitrailer (12) is approaching the guide block (200);
   a second sensor unit (100) configured for sensing when the rear end of the semitrailer (12) is approaching the loading ramp (10); wherein the second sensor unit (100) is configured to send a blocking signal to the guide block (200) when a distance between the rear end of the semitrailer (12) and the loading ramp (10) is below a preset threshold, thereby blocking movement of the sled (210);
   a third sensor unit (250), configured for sensing when an object is positioned in an area bounded by the guide block (200) and the loading ramp (10); wherein the third sensor unit (250) is configured to send a blocking signal to the guide block (200) when the object is positioned in the area bounded by the guide block (200) and the loading ramp (10), wherein the first wheel blocking means locks in position in response to the blocking signal, thereby blocking the movement of the sled (210);
   wherein the first sensor unit (240) is configured to send an activation or wakeup signal to the third sensor unit (250) when the rear end of the semitrailer (12) is sensed approaching the guide block (200), the system further comprising
   at least one piston (227, 228), wherein the sled (210) is connected to a locking means comprising a toothed rack (220), and a first locking pin (225) and a second locking pin (230) configured to engage with the toothed rack (220) when the sled (210) is in the forwarded position relative to the loading ramp (10), and configured to disengage from the toothed rack (220) upon receipt of an activation or wakeup signal from the first sensor unit (240), and wherein the first locking pin (225), or the second locking pin (230), or both the first locking pin and the second locking pin are engaged with the toothed rack (220), or disengaged from the toothed rack (220), or both engaged with and disengaged from the toothed rack by means of said at least one piston (227, 228).

2. A system for preventing semitrailer collisions with a loading ramp (10) comprising:
   a guide block (200) positioned on a ground surface, laterally and/or medially to an opening of the loading ramp (10); wherein the guide block (200) comprises a first wheel blocking means configured as a sled (210) adapted for supporting treads of a rear tire (16) of a semitrailer (12), and configured to move passively from a forwarded position relative to the loading ramp (10) to a retracted position relative to the loading ramp (10) when pushed by the rear tire as the semitrailer (12) is reversing towards the loading ramp (10);
   a first sensor unit (240) configured for sensing when a rear end of the semitrailer (12) is approaching the guide block (200);
   a second sensor unit (100) configured for sensing when the rear end of the semitrailer (12) is approaching the loading ramp (10); wherein the second sensor unit (100) is configured to send a blocking signal to the guide block (200) when a distance between the rear end of the semitrailer (12) and the loading ramp (10) is below a preset threshold, thereby blocking movement of the sled (210);

a third sensor unit (250), configured for sensing when an object is positioned in an area bounded by the guide block (200) and the loading ramp (10); wherein the third sensor unit (250) is configured to send a blocking signal to the guide block (200) when the object is positioned in the area bounded by the guide block (200) and the loading ramp (10), wherein the first wheel blocking means locks in position in response to the blocking signal, thereby blocking the movement of the sled (210);

wherein the first sensor unit (240) is configured to send an activation or wakeup signal to the third sensor unit (250) when the rear end of the semitrailer (12) is sensed approaching the guide block (200), the system further comprising at least one piston (227, 228), wherein the sled (210) is connected to a locking means comprising a toothed rack (220), and a first locking pin (225) and a second locking pin (230); and wherein the first locking pin (225) and the second locking pin (230) are configured to engage with the toothed rack (220) when the sled (210) is in the forwarded position relative to a loading ramp (10), and are configured to disengage from the toothed rack (220) upon receipt of an activation or wakeup signal from the first sensor unit (240), wherein the first locking pin (225), the second locking pin (230), or both, are engaged, disengaged, or both engaged with and disengaged from the toothed rack (220) by means of the at least one piston (227, 228); and wherein the first locking pin (225) is configured as a pivotable lever arm with a free end shaped to fit between two neighboring teeth of the toothed rack (220), and wherein the lever arm is connected to the at least one piston (227) via a wire or chain (229).

3. A system for preventing semitrailer collisions with a loading ramp (10) comprising:
a guide block (200) positioned on a ground surface, laterally and/or medially to an opening of the loading ramp (10); wherein the guide block (200) comprises a first wheel blocking means configured as a sled (210) adapted for supporting treads of a rear tire (16) of a semitrailer (12), and configured to move passively from a forwarded position relative to the loading ramp (10) to a retracted position relative to the loading ramp (10) when pushed by the rear tire as the semitrailer (12) is reversing towards the loading ramp (10);
a first sensor unit (240) configured for sensing when a rear end of the semitrailer (12) is approaching the guide block (200);
a second sensor unit (100) configured for sensing when the rear end of the semitrailer (12) is approaching the loading ramp (10); wherein the second sensor unit (100) is configured to send a blocking signal to the guide block (200) when a distance between the rear end of the semitrailer (12) and the loading ramp (10) is below a preset threshold, thereby blocking movement of the sled (210);
a third sensor unit (250), configured for sensing when an object is positioned in an area bounded by the guide block (200) and the loading ramp (10); wherein the third sensor unit (250) is configured to send a blocking signal to the guide block (200) when the object is positioned in the area bounded by the guide block (200) and the loading ramp (10), wherein the first wheel blocking means locks in position in response to the blocking signal, thereby blocking the movement of the sled (210);

wherein the first sensor unit (240) is configured to send an activation or wakeup signal to the third sensor unit (250) when the rear end of the semitrailer (12) is sensed approaching the guide block (200), the system further comprising at least one piston (227, 228), wherein the sled (210) is connected to a locking means comprising a toothed rack (220), and a first locking pin (225) and a second locking pin (230) configured to engage with the toothed rack (220) when the sled (210) is in the forwarded position relative to the loading ramp (10), and configured to disengage from the toothed rack (220) upon receipt of an activation or wakeup signal from the first sensor unit (240), wherein one or both of the first locking pin (225) and the second locking pin are engaged with, disengaged from, or both engaged with and disengaged from the toothed rack (220) by the aid of said at least one piston (227, 228); and wherein the second locking pin (230) is an elongate rod (233) with a first end pivotably connected to an elongate member (232) that is pivotably connected to the piston (228); wherein a second end of the elongate rod is shaped to fit between two neighboring teeth of the toothed rack (220).

4. A system for preventing semitrailer collisions with a loading ramp (10) comprising:
a guide block (200) positioned on a ground surface, laterally and/or medially to an opening of the loading ramp (10); wherein the guide block (200) comprises a first wheel blocking means configured as a sled (210) adapted for supporting treads of a rear tire (16) of a semitrailer (12), and configured to move passively from a forwarded position relative to the loading ramp (10) to a retracted position relative to the loading ramp (10) when pushed by the rear tire as the semitrailer (12) is reversing towards the loading ramp (10);
a first sensor unit (240) configured for sensing when a rear end of the semitrailer (12) is approaching the guide block (200);
a second sensor unit (100) configured for sensing when the rear end of the semitrailer (12) is approaching the loading ramp (10); wherein the second sensor unit (100) is configured to send a blocking signal to the guide block (200) when a distance between the rear end of the semitrailer (12) and the loading ramp (10) is below a preset threshold, thereby blocking movement of the sled (210);
a third sensor unit (250), configured for sensing when an object is positioned in an area bounded by the guide block (200) and the loading ramp (10); wherein the third sensor unit (250) is configured to send a blocking signal to the guide block (200) when the object is positioned in the area bounded by the guide block (200) and the loading ramp (10), wherein the first wheel blocking means locks in position in response to the blocking signal, thereby blocking the movement of the sled (210);

wherein the first sensor unit (240) is configured to send an activation or wakeup signal to the third sensor unit (250) when the rear end of the semitrailer (12) is sensed approaching the guide block (200), the system further comprising at least one piston (227, 228), wherein the sled (210) is connected to a locking means comprising a toothed rack (220), and a first locking pin (225) and a second locking pin (230); and wherein the first locking pin (225) and the second locking pin (230) are configured to engage with the toothed rack (220) when the sled (210) is in the forwarded position relative to the loading ramp (10), and configured to disengage from the toothed rack (220) upon receipt of an activation or wakeup signal from the first sensor unit (240), wherein the first locking pin (225), or the second locking pin (230) or both the first locking pin and the second locking pin are engaged with, disengaged from, or both engaged with and disengaged from the toothed rack (220) by the aid of said at least one piston (227, 228); wherein the second locking pin (230) is an elongate rod (233) with a first end pivotably connected to an elongate member (232) that is pivotably connected to the at least one piston (228); wherein a second end of the elongate rod is shaped to fit between two neighboring teeth of the toothed rack (220); and wherein the elongate rod (233) runs in a channel (231) formed in the sled (210).

5. A system for preventing semitrailer collisions with a loading ramp (10) comprising:
   a guide block (200) positioned on a ground surface, laterally and/or medially to an opening of the loading ramp (10); wherein the guide block (200) comprises a first wheel blocking means configured as a sled (210) adapted for supporting treads of a rear tire (16) of a semitrailer (12), and configured to move passively from a forwarded position relative to the loading ramp (10) to a retracted position relative to the loading ramp (10) when pushed by the rear tire as the semitrailer (12) is reversing towards the loading ramp (10);
   a first sensor unit (240) configured for sensing when a rear end of the semitrailer (12) is approaching the guide block (200);
   a second sensor unit (100) configured for sensing when the rear end of the semitrailer (12) is approaching the loading ramp (10); wherein the second sensor unit (100) is configured to send a blocking signal to the guide block (200) when a distance between the rear end of the semitrailer (12) and the loading ramp (10) is below a preset threshold, thereby blocking movement of the sled (210);
   a third sensor unit (250), configured for sensing when an object is positioned in an area bounded by the guide block (200) and the loading ramp (10); wherein the third sensor unit (250) is configured to send a blocking signal to the guide block (200) when the object is positioned in the area bounded by the guide block (200) and the loading ramp (10), wherein the first wheel blocking means locks in position in response to the blocking signal, thereby blocking the movement of the sled (210);
   wherein the first sensor unit (240) is configured to send an activation or wakeup signal to the third sensor unit (250) when the rear end of the semitrailer (12) is sensed approaching the guide block (200), the system further comprising
   a locking system adapted to retain and release the sled (210); wherein the locking system comprises a locking pin, and an anchor (520) positioned below said sled (210); wherein the locking pin is pivotably attached to the bottom side of said sled (210); wherein the locking pin comprises a first end (512) adapted for moving from an extended position on a top side of the sled (210) through a hole in said sled (210) to a retracted position within said hole; and a second end (514) adapted for moving from an extended position on the bottom side of said sled (210) to a retracted position also on the bottom side of said sled (210); wherein the second end (514) of said locking pin is adapted to be engaged in the retracted position with said anchor (520).

* * * * *